(12) United States Patent
Zheng et al.

(10) Patent No.: US 11,341,411 B2
(45) Date of Patent: May 24, 2022

(54) METHOD, APPARATUS, AND SYSTEM FOR TRAINING NEURAL NETWORK MODEL

(71) Applicant: Alipay (Hangzhou) Information Technology Co., Ltd., Zhejiang (CN)

(72) Inventors: Longfei Zheng, Zhejiang (CN); Jun Zhou, Zhejiang (CN); Chaochao Chen, Zhejiang (CN); Li Wang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/360,206

(22) Filed: Jun. 28, 2021

(65) Prior Publication Data

US 2022/0092414 A1    Mar. 24, 2022

(30) Foreign Application Priority Data

Sep. 18, 2020    (CN) .......................... 202010986099.2

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01); *G06N 3/0472* (2013.01)

(58) Field of Classification Search
CPC ....... G06N 3/08; G06N 3/0454; G06N 3/0472
See application file for complete search history.

(56) References Cited

U.S. PATENT DOCUMENTS

2020/0202243 A1\* 6/2020 Guttmann .............. G06N 5/043
2021/0034985 A1\* 2/2021 Vongkulbhisal ......... G06N 3/04
2021/0303913 A1\* 9/2021 Daye ....................... G06F 21/55

OTHER PUBLICATIONS

Zheng et al., "ASFGNN: Automated separated-federated graph neural network", Feb. 5, 2021, Peer-to-Peer Networking and Applications (2021) 14, pp. 1692-1704. (Year: 2021).\*
Hsu et al., "Federated Visual Classification with Real-World Data Distribution", Jul. 17, 2020, arXiv:2003.08082v3, pp. 1-21. (Year: 2020).\*

\* cited by examiner

*Primary Examiner* — Kamran Afshar
*Assistant Examiner* — Ying Yu Chen
(74) *Attorney, Agent, or Firm* — Finnegan, Henderson, Farabow, Garrett & Dunner, LLP

(57) ABSTRACT

A method for training a neural network model includes: at each first member device, obtaining predicted label data according to a first neural network submodel of the first neural network submodel by using private data for model training, and determining model update information of the first neural network submodel according to the predicted label data and real label data; providing, by each first member device, the model update information of the first neural network submodel and local sample distribution information to a second member device; at the second member device, performing neural network model reconstruction, determining an overall sample probability distribution, and allocating a reconstructed neural network model and the overall sample probability distribution to each first member device; and updating the first neural network submodel at each first member device according to a local sample probability distribution, the reconstructed neural network model, and the overall sample probability distribution.

20 Claims, 8 Drawing Sheets

METHOD, APPARATUS, AND SYSTEM FOR TRAINING NEURAL NETWORK MODEL

CROSS-REFERENCE TO RELATED APPLICATIONS

The present application is based upon and claims priority to Chinese Patent Application No. 202010986099.2, filed on Sep. 18, 2020, the entire content of which is incorporated herein by reference.

TECHNICAL FIELD

Embodiments of this specification generally relate to the field of artificial intelligence, and in particular, to a method, an apparatus, and a system for training a neural network model.

BACKGROUND

A neural network model is a machine learning model widely used in the field of machine learning. In many cases, a plurality of data owners (for example, e-commerce companies, delivery companies, and banks) respectively own different parts of feature data for training a neural network model. The plurality of data owners expect to jointly use data of each other to train a neural network model uniformly, but are unwilling to provide respective private data to other data owners to avoid leakage of the private data.

SUMMARY

In view of the above, embodiments of this specification provide a method, an apparatus, and a system for training a neural network model, to coordinate a plurality of data owners to train a neural network model. The method may improve security of respective private data of the plurality of data owners, for the plurality of data owners to use the neural network model.

According to a first aspect of embodiments of this specification, a method for training a neural network model is provided, where the neural network model includes first neural network submodels on respective first member devices, and private data of each first member device is non-independent and identically distributed data. The method includes: at each first member device, obtaining predicted label data according to the first neural network submodel by using the private data for model training, and determining model update information of the first neural network submodel according to the predicted label data and real label data; providing, by each first member device, the model update information of the first neural network submodel and local sample distribution information to a second member device; at the second member device, performing neural network model reconstruction according to the model update information of the first neural network submodel of each first member device, determining an overall sample probability distribution according to the local sample distribution information of each first member device, and allocating a reconstructed neural network model and the overall sample probability distribution to each first member device; and updating the first neural network submodel at each first member device according to a local sample probability distribution, the reconstructed neural network model, and the overall sample probability distribution.

According to a second aspect of embodiments of this specification, a method for training a neural network model is provided, where the neural network model includes first neural network submodels on respective first member devices, and private data of each first member device is non-independent and identically distributed data. The method is applicable to the first member device and includes: obtaining predicted label data according to the first neural network submodel of the first member device by using the private data for model training; determining model update information of the first neural network submodel according to the predicted label data and real label data; providing the model update information of the first neural network submodel and local sample distribution information to a second member device; obtaining a reconstructed neural network model and an overall sample probability distribution from the second member device, the reconstructed neural network model being obtained by performing reconstruction by the second member device according to the model update information of the first neural network submodel of each first member device, the overall sample probability distribution being determined by the second member device according to the local sample distribution information of each first member device; and updating the first neural network submodel according to a local sample probability distribution, the reconstructed neural network model, and the overall sample probability distribution.

According to a third aspect of embodiments of this specification, a method for training a neural network model is provided, where the neural network model includes first neural network submodels on respective first member devices, and private data of each first member device is non-independent and identically distributed data. The method is applicable to a second member device and includes: obtaining model update information of the first neural network submodels and local sample distribution information from the first member devices respectively, the model update information of the first neural network submodel at each first member device being determined by each first member device according to predicted label data and real label data, the predicted label data being obtained by each first member device according to the first neural network submodel by using the private data for model training; performing neural network model reconstruction according to the model update information of the first neural network submodel of each first member device; determining an overall sample probability distribution according to the local sample distribution information of each first member device; and allocating a reconstructed neural network model and the overall sample probability distribution to each first member device.

According to another aspect of the embodiments of this specification, an electronic device is provided. The electronic device includes: a processor; and a memory storing instructions executable by the processor, wherein the processor is configured to perform the method according to any of the first, second, or third aspect.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Figure 1:
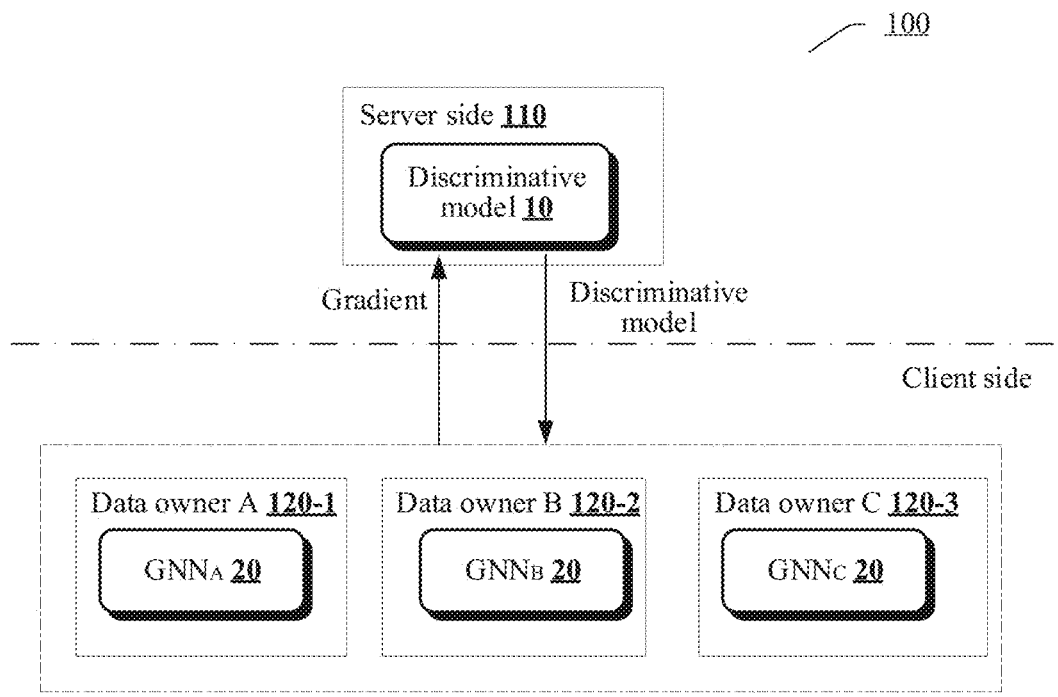
FIG. 1 is a schematic diagram of a joint learning method of a neural network model according to an embodiment.

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments consistent with the present specification.

In an example of this specification, a training sample set used in a neural network model training method may be a training sample set formed by horizontally split data sample sets. The term "horizontally split" means splitting a data sample set into a plurality of data subsets according to modules/functions (or a specified rule). Each data subset includes a part of data samples. Each data sample included in each data subset is a complete data sample, that is, all feature data and a corresponding label value of the data sample are included. For example, a plurality of data owners obtain local data to form local data sample sets, and each piece of data included in the local data sample set is a complete data sample. The local data sample sets obtained by the plurality of data owners jointly form a training sample set of a neural network model in a horizontal splitting manner, where each local data sample set is used as a training sample subset of the training sample set to train the neural network model.

In a case that the training sample set used herein is a training sample set formed by the horizontally split data sample sets, each data owner respectively owns a different part of data of the training sample used for training the neural network model. Using two data owners as an example, it is assumed that a training sample set includes 100 data samples, and each data sample includes a plurality of feature values and a label value. In this case, data owned by a first data owner may be the first 30 data samples in the training sample set, and data owned by a second data owner may be the last 70 data samples in the training sample set.

In another example of this specification, the training sample set used in the neural network model training method may be a training sample set formed by vertically split data sample sets. The term "vertically split" means splitting a data sample set into a plurality of data subsets according to modules/functions (or a specified rule), each data subset includes a part of sample data of each data sample in the data sample set, and sample data parts included in all the data subsets form the complete data sample. For example, it is assumed that there are two data owners Alice and Bob, and a data sample includes a label $y_0$ and feature data $X_A^0$ and $X_B^0$. In this case, after vertical splitting, the data owner Alice owns $y_0$ and $X_A^0$ of the data sample, and the data owner Bob owns $X_B^0$ of the data sample. Also for example, it is assumed that a data sample includes a label $y_0$ and feature data $X_A^0$, $X_B^0$, and $X_C^0$. In this case, after vertical splitting, the data owner Alice owns $y_0$, $X_A^0$, and $X_B^0$ of the data sample, and the data owner Bob owns $X_B^0$ and $X_C^0$ of the data sample. In addition to the two examples, other cases may also exist and are not listed one by one herein.

In a case that the training sample set used herein is a training sample set formed by the vertically split data sample sets, each data owner respectively owns a different data part of each training sample used for training the neural network model. Using two data owners as an example, it is assumed that a training sample set includes 100 data samples, and each data sample includes a plurality of pieces of feature data and a label value. In a case of vertical splitting, data owned by a first data owner may be a part of feature data and the label value of each data sample in the 100 data samples, and data owned by a second data owner may be the remaining feature data of each data sample in the 100 data samples.

In this specification, the term "neural network model" and the term "neural network" may be used interchangeably. The term "first member device" and the term "data owner" or "training participant" may be used interchangeably.

With the development of artificial intelligence technologies, the neural network model gradually becomes a machine learning model widely used in the industry. For example, the neural network model is widely applied to fields such as financial fraud, system recommendation, and image recognition. To implement better model performance, more training data needs to be used to train the neural network model. For example, in the medical or financial application field, different enterprises or institutions own different data samples, and once the data is used for training jointly, the model precision of the neural network model will be improved greatly, thereby bringing huge economic profits to the enterprises. How to implement cooperative training of a neural network model by a plurality of data owners becomes an urgent problem to be resolved.

In view of the above, a joint learning method is provided. In the joint learning method, a plurality of data owners jointly train a neural network model with the assistance of a server. In the embodiments of this specification, the neural network model may include a graph neural network model and a non-graph neural network model. In a case that the neural network model is a graph neural network model, the neural network model includes a discriminative model and a feature vector representation model. In a case that the neural network model is a non-graph neural network model, the neural network model may not include the feature vector representation model.

FIG. 1 is a schematic diagram of a joint learning method 100 of a neural network model, according to an embodiment. For example, the neural network model is a graph neural network (GNN) model.

As shown in FIG. 1, the neural network model is formed by a discriminative model 10 and a plurality of GNN models jointly, for example, the feature vector representation models 20-1, 20-2, and 20-3 in FIG. 1. The discriminative model 10 is deployed on a server 110, and the plurality of feature vector representation models are respectively deployed at corresponding data owners. For example, the plurality of feature vector representation models may be deployed on clients of the corresponding data owners, and each data owner includes a feature vector representation model. As shown in FIG. 1, the feature vector representation model 20-1 is deployed at a data owner A 120-1, the feature vector representation model 20-2 is deployed at a data owner B 120-2, and the feature vector representation model 20-3 is deployed at a data owner C 120-3. The feature vector representation model at each data owner is used to perform feature vector representation processing on feature data of the data owner to obtain a corresponding feature vector representation.

The discriminative model 10 is distributed to each data owner and is used by each data owner to perform model calculation based on the feature vector representation obtained from the data owner, to obtain a model prediction value at the data owner. Each data owner then determines respective discriminative model gradient information according to the calculated model prediction value and a label value, and provides the gradient information to the server 110. The server 110 updates the discriminative model by using the obtained plurality of pieces of gradient information.

In the joint learning method shown in FIG. 1, data sample sets included in the plurality of data owners are independent and identically distributed, and data features of the data samples of the plurality of data owners are independent of each other, so that a uniform feature vector representation model is constructed for the plurality of data owners. That is, the feature vector representation models of the plurality of data owners have the same model structure, so that network depths (quantities of network layers) are the same and each layer of the network includes the same quantity of nodes.

In some instances, samples of the data owners correspond to different users, the users are located in different regions, and data is acquired in different time windows. Therefore, when the joint training is performed, the data sample sets of the plurality of data owners may have different feature distributions or label distributions, and features are not independent of each other. Such data sample sets are referred to as non-independent and identically distributed (Non-IID) data sample sets.

The Non-IID data sample set is described by using a non-uniform label distribution as an example. It is assumed that there are 10 types of pictures for a CIFAR-10 picture data set: airplane, vehicle, bird, and the like. When a plurality of data owners perform joint training, one data owner only includes one or some types of pictures. For example, a data owner A only owns airplane pictures, a data owner B only owns vehicle pictures, and so on, leading to a non-uniform sample label distribution among the plurality of data owners.

Figure 2:
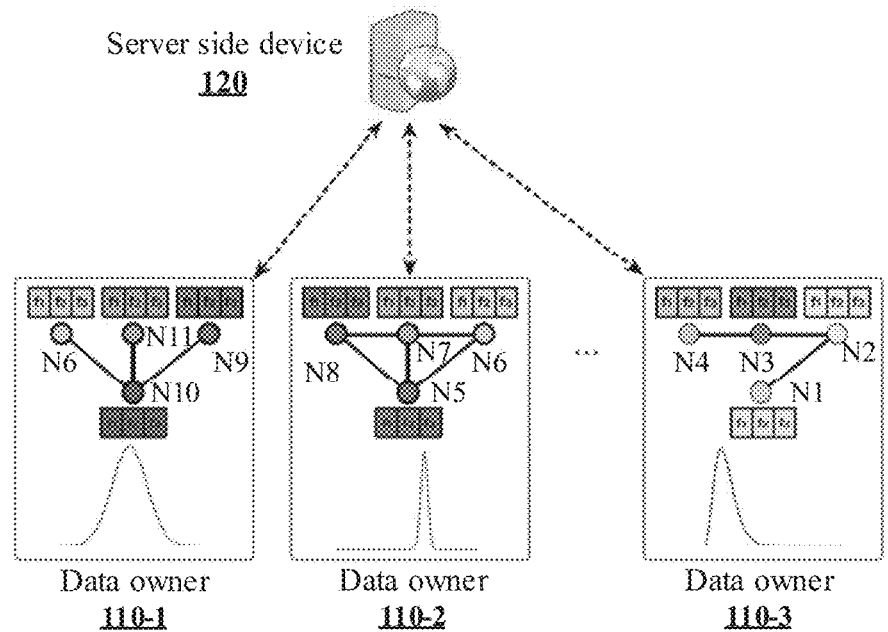
FIG. 2 is a schematic diagram of performing neural network model training by a plurality of data owners with non-independent and identically distributed private data sample sets according to an embodiment.

FIG. 2 is a schematic diagram of performing neural network model training jointly by a plurality of data owners with horizontally split non-independent and identically distributed private data sample sets, according to an embodiment.

As shown in FIG. 2, the private data sample sets owned by the plurality of data owners are horizontally split Non-IID data. The plurality of data owners have the same feature space (f1, f2, f3), but the data sample sets of the data owners have different data distributions. In addition, the Non-IID data of the plurality of data owners includes different sample nodes, and probability distributions of sample node labels are also different.

In a case that the private data of the plurality of data owners is Non-IID data sample sets, in a process of model training, a discriminative model on the server is directly utilized to update local discriminative models on the side of the plurality of data owners to perform model prediction. In this case, personalized representation of local data may not be implemented, and model diversity is affected, leading to relatively poor overall performance of the neural network model obtained through training.

In view of the above, an embodiment of this specification provides a method for training a neural network model. In the method for training a neural network model, the neural network model includes first neural network submodels on respective first member devices, and private data of each first member device is non-independent and identically distributed data. When model training is performed, each first member device obtains predicted label data according to the first neural network submodel by using the private data for model training, and determines model update information of the local first neural network submodel according to the predicted label data and real label data. Each first member device then provides the model update information of the first neural network submodel and local sample distribution information to a second member device. The second member device performs neural network model reconstruction according to the model update information of the first neural network submodel of each first member device, determines an overall sample probability distribution according to the local sample distribution information of each first member device, and allocates a reconstructed neural network model and the overall sample probability distribution to each first member device. Each first member device updates the local first neural network submodel according to a local sample probability distribution, the reconstructed neural network model, and the overall sample probability distribution. Model training is cyclically performed according to the foregoing manner until an end-of-cycle condition is met.

According to the foregoing model training solution, for the first neural network submodels on the first member devices, local model update information about the update of the first neural network submodel is determined at each first member device according to a loss function that is determined locally; neural network model reconstruction is performed at the second member device by using the local model update information of the first neural network submodel of each first member device, and the overall sample probability distribution is determined according to the local sample distribution information of each first member device; the local first neural network submodel is then updated at each first member device by using the local sample probability distribution of each first member device, the reconstructed neural network model, and the overall sample probability distribution. In this way, the first neural network submodel on each first member device is not directly replaced with a second neural network submodel on the second member device; instead, model update is performed by using the local sample probability distribution of each first member device, the reconstructed neural network model, and the overall sample probability distribution, thereby implementing personalized model update for local data, ensuring that the model diversity is not affected, and further improving overall performance of the neural network model obtained through training.

The method, the apparatus, and the system for training a neural network model according to the embodiments of this specification are described in detail below with reference to the accompanying drawings.

Figure 3:
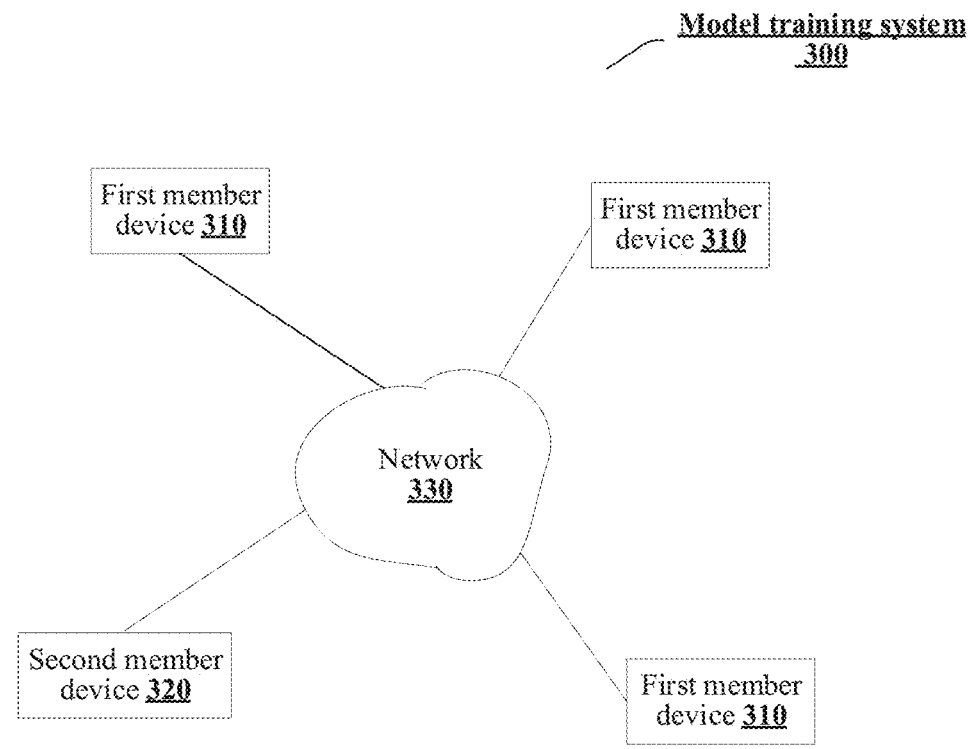
FIG. 3 is a schematic diagram of a system for training a neural network model according to an embodiment.

FIG. 3 is a schematic diagram of a system for training a neural network model, referred to as a model training system 300, according to an embodiment of this specification.

As shown in FIG. 3, the model training system 300 includes at least two first member devices 310 and a second member device 320. Three first member devices 310 are shown in FIG. 3. In other embodiments of this specification, more or fewer first member devices 310 may be included. At least one first member device 310 and the second member device 320 may communicate with each other by using a network 330 such as the Internet or a local area network, which is not limited in the embodiment.

In the embodiment, the first member device may be a device used for locally collecting data samples, such as an intelligent terminal device or a server device. The first member device may also be referred to as a "data owner" or a "data holder". Local data of the first member device may include local private data and local non-private data. For example, the local private data is private data that cannot be leaked to another member device. Therefore, model training cannot be performed in plaintext or the data cannot be fully shared to another member device. The local non-private data refers to local data that can be shared to another member device. The local non-private data can be used by another member device to form public domain data.

In addition, a first neural network submodel is further deployed on the first member device. In an example, a model structure of the first neural network submodel on each first member device may be determined according to a data distribution feature of the private data in the first member device. At each first member device, the local private data is provided to the first neural network submodel to perform model prediction. The first neural network submodels on the first member devices may include the same model structure.

In the embodiment, the private data in the first member devices jointly forms training data of a neural network model, and a model parameter of the first neural network submodel and the private data that are owned by each first member device are secrets of the first member device and cannot be learned or fully learned by another first member device.

In an example, the second member device may be a device that is not configured with or does not maintain a neural network submodel. In another example, the second member device may alternatively be a device that is configured with or maintains a second neural network submodel, such as a terminal device or a server device. The first neural network submodel and the second neural network submodel may include the same model structure.

In an example, the first member devices may be, for example, private data storage servers or intelligent terminal devices of different financial institutions or medical institutions, and the second member device may be, for example, a server of a third-party payment platform.

In the embodiment, the plurality of first member devices 310 and the second member device 320 use the private data of the plurality of first member devices 310 together to cooperatively train a neural network model. An example training process of the neural network model is described in detail below.

In the embodiment, the first member device 310 and the second member device 320 may be any suitable electronic device with a calculation capability. The electronic device includes, but is not limited to: a personal computer, a server computer, a workstation, a desktop computer, a laptop computer, a notebook computer, a mobile electronic device, a smart phone, a tablet computer, a cellular phone, a personal digital assistant (PDA), a handheld apparatus, a messaging device, a wearable electronic device, a consumer electronic device, and the like.

Examples of the neural network model may include, but are not limited to, a deep neural network (DNN) model, a convolutional neural network (CNN) model, a BP neural network model, and the like. Description is made below by using the DNN model as an example. A DNN is an artificial neural network including an input layer, a plurality of hidden layers, and an output layer. Each layer in the DNN is formed by a plurality of independent neurons (that is, nodes), neurons of two adjacent layers are mutually connected, neurons of the same layer are not mutually connected, and each connection corresponds to a weight parameter.

Figure 4:
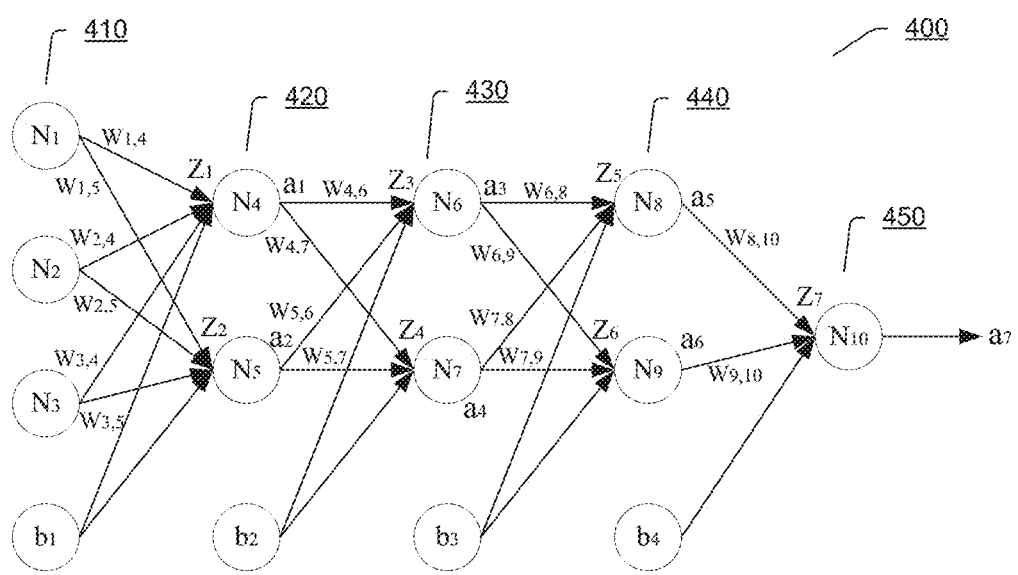
FIG. 4 is a schematic diagram of a deep neural network model according to an embodiment.

FIG. 4 is a schematic diagram of a DNN model 400 according to an embodiment. As shown in FIG. 4, the DNN model 400 includes an input layer 410, a first hidden layer 420, a second hidden layer 430, a third hidden layer 440, and an output layer 450.

For example, the input layer 410 includes three input nodes $N_1$, $N_2$, and $N_3$, and a bias $b_1$. The three input nodes $N_1$, $N_2$, and $N_3$ respectively receive data from three different data owners. The first hidden layer 420 includes two hidden layer nodes $N_4$ and $N_5$ and a bias $b_2$. The hidden layer nodes $N_4$ and $N_5$ are each fully connected to the three input nodes $N_1$, $N_2$, and $N_3$ and the bias $b_1$ of the input layer 410. Weights between the input node $N_1$ and the hidden layer nodes $N_4$ and $N_5$ are respectively $W_{1,4}$ and $W_{1,5}$. Weights between the input node $N_2$ and the hidden layer nodes $N_4$ and $N_5$ are respectively $W_{2,4}$ and $W_{2,5}$. Weights between the input node $N_3$ and the hidden layer nodes $N_4$ and $N_5$ are respectively $W_{3,4}$ and $W_{3,5}$.

For example, the second hidden layer 430 includes two hidden layer nodes $N_6$ and $N_7$ and a bias $b_3$. The hidden layer nodes $N_6$ and $N_7$ are each fully connected to the two hidden layer nodes $N_4$ and $N_5$ and the bias $b_2$ of the first hidden layer 420. Weights between the hidden layer node $N_4$ and the hidden layer nodes $N_6$ and $N_7$ are respectively $W_{4,6}$ and $W_{4,7}$. Weights between the hidden layer node $N_5$ and the hidden layer nodes $N_6$ and $N_7$ are respectively $W_{5,6}$ and $W_{5,7}$.

For example, the third hidden layer 440 includes two hidden layer nodes $N_8$ and $N_9$ and a bias $b_4$. The hidden layer nodes $N_8$ and $N_9$ are each fully connected to the two hidden layer nodes $N_6$ and $N_7$ and the bias $b_3$ of the second hidden layer 430. Weights between the hidden layer node $N_6$ and the hidden layer nodes $N_8$ and $N_9$ are respectively $W_{6,8}$ and $W_{6,9}$. Weights between the hidden layer node $N_7$ and the hidden layer nodes $N_8$ and $N_9$ are respectively $W_{7,8}$ and $W_{7,9}$.

For example, the output layer 450 includes an output node $N_{10}$. The output node $N_{10}$ is fully connected to the two hidden layer nodes $N_8$ and $N_9$ and the bias $b_4$ of the third hidden layer 440. A weight between the hidden layer node $N_8$ and the output node $N_{10}$ is $W_{8,10}$. A weight between the hidden layer node $N_9$ and the output node $N_{10}$ is $W_{9,10}$.

In the neural network model shown in FIG. 4, the weights $W_{1,4}$, $W_{1,5}$, $W_{2,4}$, $W_{2,5}$, $W_{3,4}$, $W_{3,5}$, $W_{4,6}$, $W_{4,7}$, $W_{5,6}$, $W_{5,7}$, $W_{6,8}$, $W_{6,9}$, $W_{7,8}$, $W_{7,9}$, $W_{8,10}$, and $W_{9,10}$ are model parameters of the layers of the neural network model. When feedforward calculation is performed, the input nodes $N_1$, $N_2$, and $N_3$ of the input layer 410 obtain inputs $Z_1$ and $Z_2$ of the hidden layer nodes $N_4$ and $N_5$ of the first hidden layer 420 through calculation, where $Z_1=W_{1,4}*X_1+W_{2,4}*X_2+W_{3,4}*X_3+b_1$, and $Z_1=W_{1,5}*X_1+W_{2,5}*X_2+W_{3,5}*X_3+b_1$. Activation function processing is then performed on $Z_1$ and $Z_2$ respectively, to obtain inputs $a_1$ and $a_2$ of the hidden layer nodes $N_4$ and $N_5$. Feedforward calculation is performed layer-by-layer according to the foregoing manner, and as shown in FIG. 4, an output $a_7$ of the neural network model is finally obtained.

In an example, the sample distribution information may be label-based sample distribution information, feature-based sample distribution information, or connection edge quantity-based sample distribution information (in a case that sample data is graph data). In an example, the sample distribution information may be, for example, sample quantity statistics. Correspondingly, the sample probability distribution may be a label-based sample probability distribution, a feature-based sample probability distribution, or a connection edge quantity-based sample probability distribution. Description is made below by using an example in which label-based sample quantity statistics are used as the sample distribution information. In other embodiments of this specification, feature-based sample distribution information or connection edge quantity-based sample distribution information may be alternatively used.

Figure 5:
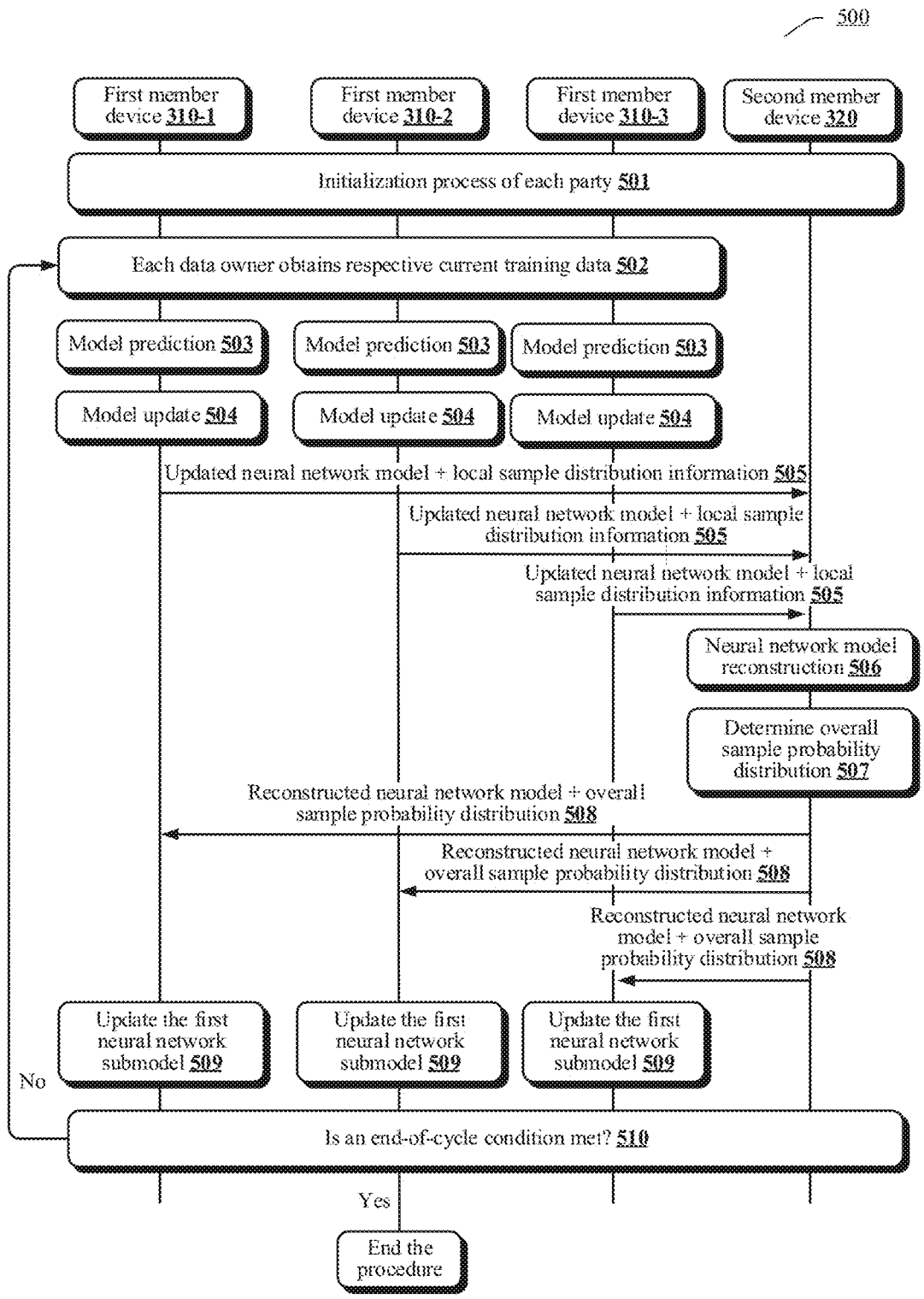
FIG. 5 is a flowchart of a method for training a neural network model according to an embodiment.

FIG. 5 is a flowchart of a method 500 for training a neural network model according to an embodiment. In the method 500, a data sample set owned by a plurality of data owners may be a horizontally split data sample set, or may be a vertically split data sample set.

Figure 6:
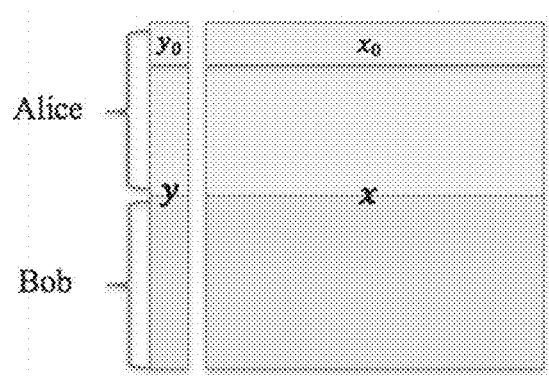
FIG. 6 is a schematic diagram of a horizontally split data sample set according to an embodiment.

FIG. 6 is a schematic diagram of a horizontally split data sample set according to an embodiment. FIG. 6 shows two data owners Alice and Bob, and the case of more than two data owners is similar. Each piece of data sample in the data sample set owned by each of the data owners Alice and Bob is complete, that is, each piece of data sample includes complete feature data (x) and label data (y). For example, Alice owns a complete data sample ($x_0$, $y_0$).

Figure 7:
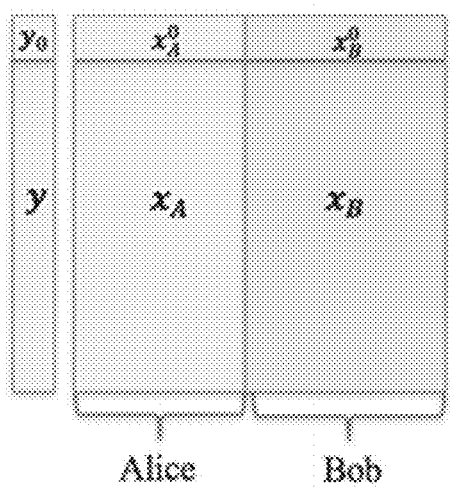
FIG. 7 is a schematic diagram of a vertically split data sample set according to an embodiment.

FIG. 7 is a schematic diagram of a vertically split data sample set according to an embodiment. FIG. 7 shows two data owners Alice and Bob, and the case of more than two data owners is similar. Each of the data owners Alice and Bob owns partial data of each data sample in the data sample set for model training. For each data sample, complete content of the data sample may be formed by combining data parts owned by the data owners Alice and Bob together. For example, it is assumed that a data sample includes a label $y_0$ and feature data $X_A^0$ and $X_B^0$. In this case, after vertical splitting, the data owner Alice owns the label $y_0$ and the feature data $X_A^0$, and the data owner Bob owns the feature data $X_B^0$.

Referring to FIG. 5, in 501, first neural network submodels at first member devices 310-1 to 310-3 are initialized. For example, at each of the first member devices 310-1 to 310-3, each first neural network submodel is initialized respectively according to data dimensions of respective private data and a network structure of the first neural network submodel. In an example, in a case that the neural network model is a graph neural network model, the first neural network submodel includes a feature vector representation model and a first discriminative model. Correspondingly, a respective feature vector representation model $H_{i,1}$ and a first discriminative model $H_{i,2}$ are respectively initialized at each of the first member devices according to the data dimensions of the respective private data and a network structure of the feature vector representation model and a network structure of the first discriminative model, where i represents a serial number of each of the first member devices. For example, a feature vector representation model $H_{1,1}$ and a first discriminative model $H_{1,2}$ at the first member device 310-1 are initialized, a feature vector representation model $H_{2,1}$ and a first discriminative model $H_{2,2}$ at the first member device 310-2 are initialized, and a feature vector representation model $H_{3,1}$ and a first discriminative model $H_{3,2}$ at the first member device 310-3 are initialized.

Operations from 502 to 510 are then performed cyclically until an end-of-cycle condition is met.

In 502, each of the first member devices 310-1 to 310-3 obtains training data (e.g., batch sample data) for model training from respective private data.

In 503, model prediction is performed by using the respective first neural network submodel according to the obtained current training data at each of the first member devices 310-1 to 310-3, to obtain predicted label data at each of the first member devices. For example, in the example in which the neural network model is a graph neural network model, the obtained current training data is provided to the respective feature vector representation model at each of the first member devices 310-1 to 310-3, to obtain a feature vector representation at the first member device. The obtained feature vector representation is then provided to the first discriminative model, to obtain the predicted label data at the first member device.

In 504, model update is performed at each of the first member devices 310-1 to 310-3 according to the predicted label data and real label data, to obtain model update information of the first neural network submodel. For example, in the example in which the neural network model is a graph neural network model, the feature vector representation model is updated according to the predicted label data and the real label data, and model update information of the first discriminative model is determined.

In an example, no second neural network submodel is deployed on the second member device, and the model update information of the first neural network submodel includes a model parameter of the first neural network submodel after the update. Correspondingly, a loss function is first determined at each of the first member devices according to the predicted label data and the real label data. The model parameter of the first neural network submodel is then updated through back propagation according to the determined loss function. In an example, the neural network model is a graph neural network model, no second discriminative model is deployed on the second member device, and the model update information of the first discriminative model includes a model parameter of the first discriminative model after the update. Correspondingly, a loss function is first determined at each of the first member devices according to the predicted label data and the real label data. A model parameter $<H_{i,1}>$ of the feature vector representation model and the model parameter $<H_{i,2}>$ of the first discriminative model are then updated through back propagation according to the determined loss function.

In another example, a second neural network submodel is deployed on the second member device, and the model update information of the first neural network submodel includes a model update volume of the first neural network submodel. Correspondingly, a loss function is first determined at each of the first member devices according to the predicted label data and the real label data. The model update volume of the first neural network submodel is then determined through back propagation according to the determined loss function. In an example, the neural network model is a graph neural network model, a second discriminative model is deployed on the second member device, and the model update information of the first discriminative model includes a model update volume of the first discriminative model. Correspondingly, a loss function is first determined at each of the first member devices according to the predicted label data and the real label data. According to the determined loss function, a model parameter $<H_{i,1}>$ of the feature vector representation model is then updated through back propagation, and the model update volume $<H_{i,2}>$ of the first discriminative model is determined.

In 505, each first member device provides the model update information of the first neural network submodel and local sample distribution information to a second member device. For example, in the example in which the neural network model is a graph neural network model, each first member device provides the model update information $<H_{i,2}>$ of the first discriminative model and local sample distribution information to the second member device. For example, in a case that the sample distribution information is label-based sample quantity statistics, each first member device provides the model update information of the first neural network submodel and label-based local sample quantity statistics to the second member device. In an example, label-based local sample quantity statistics at an $i^{th}$ first member device may be represented by using a sample data vector $\vec{N}_i = \{N_{i,1}, \ldots, N_{i,k}\}$, where i is a serial number of the first member device, k is a quantity of labels in label data, and an element $N_{i,j}$ in the sample data vector $\vec{N}_i$ represents a quantity of data samples that are marked with a label j in the $i^{th}$ first member device. After the label-based sample quantity statistics are obtained, a local sample probability distribution $\vec{Q}_i = \{Q_{i,1}, \ldots, Q_{i,k}\}$ of current training data may be determined based on the sample quantity statistics, where $Q_{ij} = N_{i,j}/N_t$, $N_t$ is a total quantity of data samples of the current training data, and $$\sum_{i=1}^{k} Q_{i,j} = 1.$$

The local sample probability distribution herein corresponds to the foregoing label-based local sample probability distribution.

In an example, each first member device may provide the model update information of the first neural network submodel and the label-based local sample distribution information to the second member device through secure aggregation. An example of the secure aggregation may include, but is not limited to, secret sharing-based secure aggregation, homomorphic encryption-based secure aggregation, oblivious transfer-based secure aggregation, garbled circuit-based secure aggregation, or trusted execution environment-based secure aggregation. In addition, in other examples of this specification, other suitable secure aggregation manners may be used.

In 506, neural network model reconstruction is performed at the second member device 320 according to the model update information of the first neural network submodels of the first member devices 310-1 to 310-3. In an example, the neural network model is a graph neural network model, and discriminative model reconstruction is performed at the second member device 320 according to the model update information of the first discriminative models of the first member devices 310-1 to 310-3.

In an example, no second neural network submodel is deployed on the second member device, and the model update information of the first neural network submodel includes a model parameter of the first neural network submodel after the update. A model parameter of the neural network model may be reconstructed at the second member device by calculating a mean of model parameters of the first neural network submodels after the update. In addition, neural network model reconstruction may be alternatively performed in another suitable manner according to the model parameters of the first neural network submodels after the update. In the example in which the neural network model is a graph neural network model, neural network model reconstruction is model reconstruction for a discriminative model. For example, a model parameter of the discriminative model may be reconstructed at the second member device by calculating a mean of model parameters of the first discriminative models after the update.

In another example, a second neural network submodel is deployed on the second member device, and the model update information of the first neural network submodel includes a model update volume of the first neural network submodel. Neural network model reconstruction may be performed at the second member device according to the model update volume of the first neural network submodel of each first member device and the second neural network submodel. In the example in which the neural network model is a graph neural network model, a second discriminative model is deployed on the second member device. Correspondingly, discriminative model reconstruction may be performed at the second member device according to the model update volume of the first discriminative model of each first member device and the current second discriminative model.

In another example, each first member device may be provided with a model reconstruction weight $W_i$. The model parameter of the neural network model may be reconstructed at the second member device according to the model update information of the first neural network submodel of each first member device and the model reconstruction weight of each first member device. For example, in the example in which the neural network model is a graph neural network model, the model parameter $$H_2 = \sum_{i=1}^{n} (\langle H_{i,2} \rangle * W_i)$$

of the discriminative model may be reconstructed according to the model update information of the first discriminative model of each first member device and the model reconstruction weight of each first member device. In an example, the model reconstruction weight $W_i$ of each first member device may be determined according to data quality of the private data of each first member device and/or a sample quantity of the batch sample data.

In 507, an overall sample probability distribution is determined according to the local sample distribution information of each first member device. In an example, the overall sample probability distribution $\vec{Q}=\{Q_1, \ldots, Q_k\}$ may be determined according to the label-based local sample quantity statistics $\vec{N}_i=\{N_{i,j}, \ldots, N_{i,k}\}$ of each first member device, where $Q_j$ represents a probability that data samples in total data samples used for neural network model training are marked with a label j.

In an example, overall sample quantity statistics $$\vec{N} = \sum_{i=1}^{n} \vec{N}_i = \{N_1, \ldots, N_k\}$$

are first determined by using the sample quantity statistics $\vec{N}_i=\{N_{i,1}, \ldots, N_{i,k}\}$ of each first member device, where $N_j$ represents a quantity of samples that are marked with the label j in the total data samples. The overall sample probability distribution $\vec{Q}=\{Q_1, \ldots, Q_k\}$ is then determined according to the overall sample quantity statistics $\vec{N}$, where $Q_j=N_j/N_t$.

In 508, a reconstructed neural network model and the overall sample probability distribution are allocated to each first member device. For example, in a case that the sample distribution information is label-based sample quantity statistics, the reconstructed neural network model $H_2$ and the overall sample probability distribution $\vec{Q}=\{Q_1, \ldots, Q_k\}$ may be allocated to each first member device. In the example in which the neural network model is a graph neural network model, the reconstructed discriminative model $H_2$ and the overall sample probability distribution $\vec{Q}=\{Q_1, \ldots, Q_k\}$ may be allocated to each first member device.

In 509, the first neural network submodel is updated at each first member device according to a local sample probability distribution, the reconstructed neural network model, and the overall sample probability distribution. The local sample probability distribution herein may be determined according to the local sample distribution information. For example, in a case that the sample distribution information is label-based sample quantity statistics, the first neural network submodel may be updated at each first member device according to the local sample probability distribution $\vec{Q}_i=\{Q_{i,1}, \ldots, Q_{i,k}\}$, the reconstructed neural network model, and the overall sample probability distribution $\vec{Q}=\{Q_1, \ldots, Q_k\}$. In the example in which the neural network model is a graph neural network model, the first discriminative model is updated at each first member device according to the local sample probability distribution $\vec{Q}_i=\{Q_{i,1}, \ldots, Q_{i,k}\}$, the reconstructed discriminative model, and the overall sample probability distribution $\vec{Q}=\{Q_1, \ldots, Q_k\}$.

In an example, when the model parameter of the first neural network submodel is updated according to the local sample probability distribution $\vec{Q}_i=\{Q_{i,1}, \ldots, Q_{i,k}\}$, a model parameter of the reconstructed neural network model, and the overall sample probability distribution $\vec{Q}=\{Q_1, \ldots, Q_k\}$, a distribution similarity between the sample probability distribution $\vec{Q}_i=\{Q_{i,1}, \ldots, Q_{i,k}\}$ of each first member device and the overall sample probability distribution $\vec{Q}=\{Q_1, \ldots, Q_k\}$ is first determined at each first member device. The model parameter of the first neural network submodel is then updated at each first member device according to the determined distribution similarity and the model parameter of the reconstructed neural network model. In the example in which the neural network model is a graph neural network model, the model parameter of the first discriminative model is updated at each first member device according to the determined distribution similarity and a model parameter of the reconstructed discriminative model.

In an example, the distribution similarity may be a JS divergence. In this case, the JS divergence at each first member device may be calculated according to formula (1):

$$JS_i(\vec{Q} \| \vec{Q}_i) = \frac{1}{2} KL\left(\vec{Q} \left\| \frac{\vec{Q}+\vec{Q}_i}{2}\right.\right) + \frac{1}{2} KL\left(\vec{Q}_i \left\| \frac{\vec{Q}+\vec{Q}_i}{2}\right.\right) \quad (1)$$

where function $KL(\vec{P}_1 \| \vec{P}_2) = \sum_{x \in X} \vec{P}_1(x) \log \frac{\vec{p}_1(x)}{\vec{p}_2(x)}$.

The model parameter of the first neural network submodel at each first member device is then updated according to formula (2).

$$\vec{H}_{i,2} = JS_i \cdot H_2 + (1-JS_i) \cdot H_{i,2} \quad (2)$$

where $\vec{H}_{i,2}$ is a model parameter of the first neural network submodel after the update at the $i^{th}$ first member device, $H_{i,2}$ is a model parameter of the first neural network submodel before the update at the $i^{th}$ first member device, and $H_2$ is a model parameter of the reconstructed neural network model.

In the example in which the neural network model is a graph neural network model, $\vec{H}_{i,2}$ is a model parameter of the first discriminative model after the update at the $i^{th}$ first member device, $H_{i,2}$ is a model parameter of the first discriminative model before the update at the $i^{th}$ first member device, and $H_2$ is a model parameter of the reconstructed discriminative model.

In 510, it is determined whether an end-of-cycle condition is met, for example, whether a predetermined number of cycles is reached. If the predetermined number of cycles is reached, the procedure is ended. If the predetermined number of cycles is not reached, a next training cycle is executed by returning to the operation of 502. The first neural network submodel of each first member device that is updated in the current cycle is used as a current model of the next training cycle. It should be noted that, in another example of this specification, an end condition of the training cycle may alternatively be that a change volume of the model parameter of each first neural network submodel is not greater than a predetermined threshold. In the example in which the neural network model is a graph neural network model, the feature vector representation model and the first discriminative model of each first member device that are updated in the current cycle are used as current models of the next training cycle. In addition, the end condition of the training cycle may alternatively be that a change volume of the model parameter of each first discriminative model is not greater than a predetermined threshold.

Figure 8:
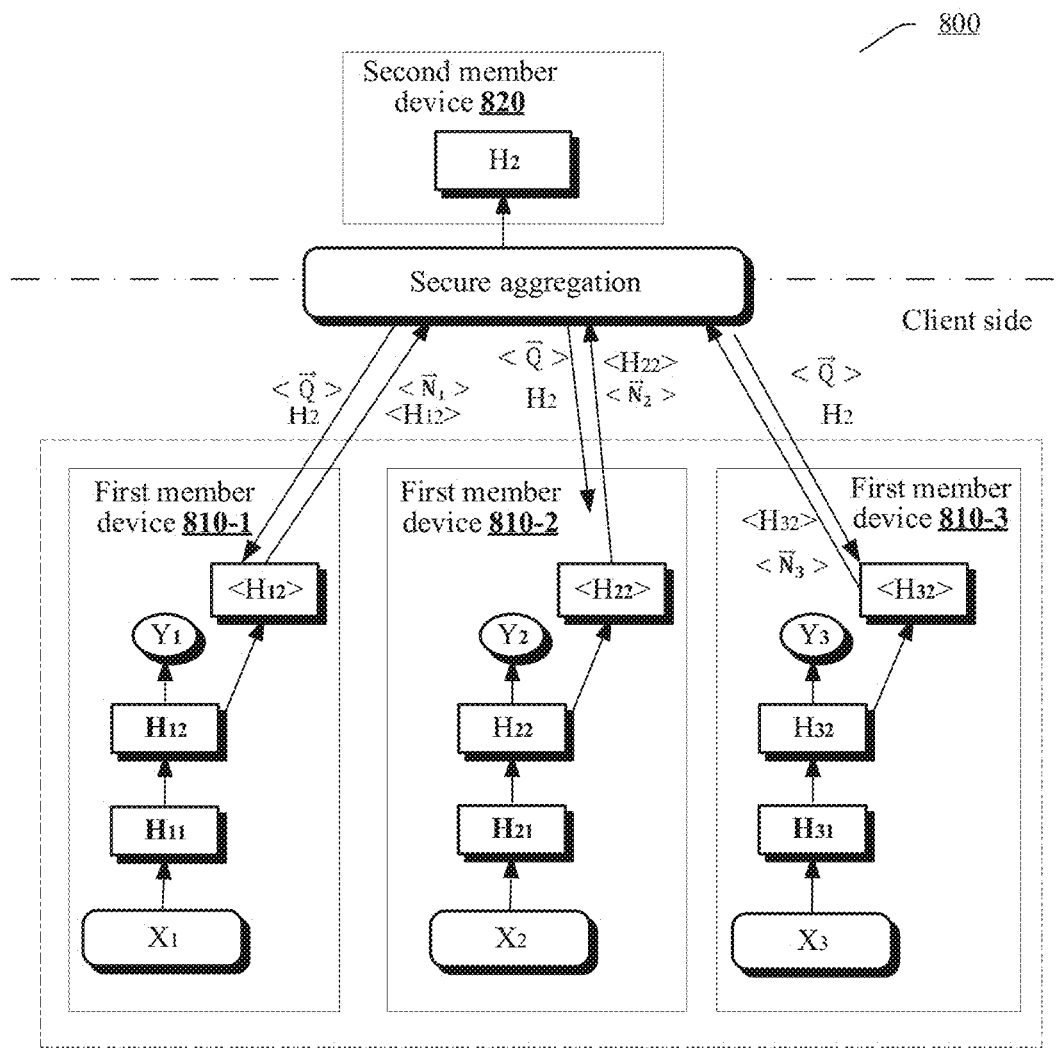
FIG. 8 is a schematic diagram of a method for training a neural network model according to an embodiment.

FIG. 8 is a schematic diagram of a method 800 for training a neural network model according to an embodiment. For example, the neural network model is a graph neural network model, and the first neural network submodel includes a feature vector representation model and a first discriminative model.

FIG. 8 shows three first member devices 810-1, 810-2, 810-3, and a second member device 820. The first member device 810-1 includes a feature vector representation model $H_{1,1}$ and a first discriminative model $H_{1,2}$. The first member device 810-2 includes a feature vector representation model $H_{2,1}$ and a first discriminative model $H_{2,2}$. The first member device 810-3 includes a feature vector representation model $H_{3,1}$ and a first discriminative model $H_{3,2}$. The first member devices 810-1, 810-2, and 810-3 include training data $X_1$, $X_2$, and $X_3$.

When model training is performed, in each round of cycle, the first member devices 810-1, 810-2, and 810-3 obtain the respective current training data $X_1$, $X_2$, and $X_3$.

The first member devices 810-1, 810-2, and 810-3 then provide the current training data $X_1$, $X_2$, and $X_3$ to the respective current feature vector representation models $H_{1,1}$, $H_{2,1}$, and $H_{3,1}$, to obtain a feature vector representation at each first member device. At each first member device, the obtained feature vector representation is then provided to the respective first discriminative model to obtain current predicted label data.

Each first member device calculates a loss function according to the predicted label data and corresponding real label data. Each first member device then updates the feature vector representation model and a model parameter $<H_{i,2}>$ of the first discriminative model through back propagation based on the loss function.

Next, each first member device sends the model parameter $<H_{i,2}>$ of the first discriminative model and local sample distribution information to the second member device 820 through secure aggregation.

The second member device 820 reconstructs a discriminative model $H_2$ according to the model parameter $<H_{i,2}>$ of the first discriminative model obtained from each first member device, and determines an overall sample probability distribution according to the local sample distribution information of each first member device. The second member device 820 then allocates a model parameter $H_2$ of the reconstructed discriminative model and the overall sample probability distribution to each first member device.

After receiving the model parameter $H_2$ of the reconstructed discriminative model and the overall sample probability distribution, each first member device updates the model parameter of the first discriminative model according to a local sample probability distribution, the reconstruct discriminative model $H_2$, and the overall sample probability distribution. Operations are performed cyclically according to the foregoing manner until an end-of-cycle condition is met, to complete the training process of a neural network model.

In another example, a second discriminative model may be deployed on the second member device 820, and a model structure of the second discriminative model and a model structure of the first discriminative model are the same. In this example, each first member device provides a model update volume of the respective first discriminative model to the second member device, and the second member device then performs discriminative model reconstruction based on the received model update volume of the first discriminative model of each first member device and the second discriminative model.

In addition, it should be noted that, in the examples illustrated in FIG. 3 to FIG. 8, there are three first member devices in the model training method, and in other examples, more or fewer than three first member devices may be included.

According to the foregoing model training method, local model update information about the update of the first neural network submodel is determined at each first member device according to the locally determined loss function; neural network model reconstruction is performed at the second member device by using the local model update information of the first neural network submodel of each first member device, and the overall sample probability distribution is determined according to the local sample distribution information of each first member device; the local first neural network submodel is then updated at each first member device according to the local sample probability distribution, the reconstructed neural network model, and the overall sample probability distribution rather than being directly replaced with the second neural network submodel on the second member device, thereby implementing personalized model update for local data, ensuring that the model diversity is not affected, and further improving overall performance of the neural network model obtained through training.

In addition, according to the foregoing model training method, the first neural network submodel is determined to update at the first member device based on the locally determined loss function, and the model parameter of the first neural network submodel after the update is used as the model update information and provided to the second member device to perform neural network model reconstruction, and model update is performed on the first neural network submodel again by using the reconstructed neural network model, thereby implementing model update of the first neural network submodel on each first member device through two local neural network model update processes. This method can further improve an effect of personalized model update for the local data.

In addition, according to the foregoing model training method, each first member device provides the model update information of the first neural network submodel and the local sample distribution information to the second member device through secure aggregation, and the model update information of each first member device is prevented from being fully provided to the second member device, thereby preventing the second member device from reversely derive private data of the first member device by using the received model update information, so that the private data of the first member device is protected.

Figure 9:
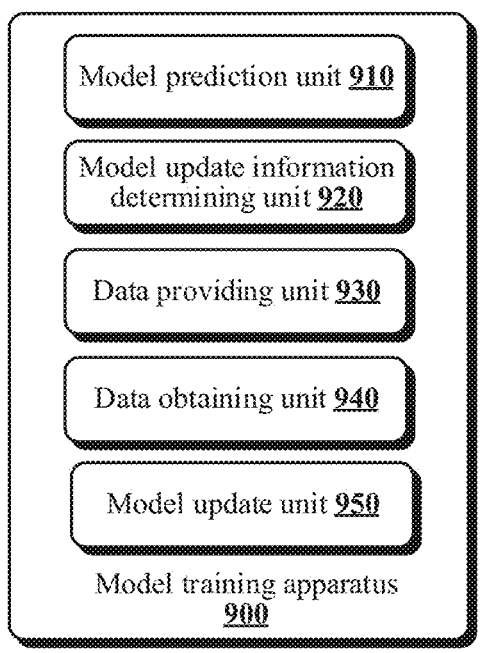
FIG. 9 is a block diagram of an apparatus for training a neural network model according to an embodiment.

FIG. 9 is a block diagram of an apparatus 900 for training a neural network model, hereinafter referred to as the model training apparatus 900, according to an embodiment. In this embodiment, the neural network model includes first neural network submodels on respective first member devices, and private data of each first member device is non-independent and identically distributed data. The model training apparatus 900 is applied to a first member device.

As shown in FIG. 9, the model training apparatus 900 includes a model prediction unit 910, a model update information determining unit 920, a data providing unit 930, a data obtaining unit 940, and a model update unit 950.

When model training is performed, the model prediction unit 910, the model update information determining unit 920, the data providing unit 930, the data obtaining unit 940, and the model update unit 950 operate cyclically until an end-of-cycle condition is met. The end-of-cycle condition may include, for example: a predetermined number of cycles is reached, or a change volume of a model parameter of each first neural network submodel is not greater than a predetermined threshold. Before the end of cycle, the first neural network submodel of each first member device after the update is used as a current model of a next cycle.

The model prediction unit 910 is configured to obtain predicted label data according to the first neural network submodel by using the private data for model training. For example, the model prediction unit 910 may provide the private data for model training to the first neural network submodel sequentially to obtain the predicted label data. For an operation of the model prediction unit 910, reference may be made to the operation of 503 described in FIG. 5 above.

The model update information determining unit 920 is configured to determine model update information of the first neural network submodel according to the predicted label data and real label data. For an operation of the model update information determining unit 920, reference may be made to the operation of 504 described in FIG. 5 above.

The data providing unit 930 is configured to provide the model update information of the first neural network submodel and local sample distribution information to a second member device. For an operation of the data providing unit 930, reference may be made to the operation of 505 described in FIG. 5 above.

The data obtaining unit 940 is configured to obtain a reconstructed neural network model and an overall sample probability distribution from the second member device. The reconstructed neural network model is reconstructed by the second member device according to the model update information of the first neural network submodel of each first member device, and the overall sample probability distribution is determined by the second member device according to the local sample distribution information of each first member device. For an operation of the data obtaining unit 940, reference may be made to the operation of 508 described in FIG. 5 above.

The model update unit 950 is configured to update the first neural network submodel according to a local sample probability distribution, the reconstructed neural network model, and the overall sample probability distribution. For an operation of the model update unit 950, reference may be made to the operation of 509 described in FIG. 5 above.

Figure 10:
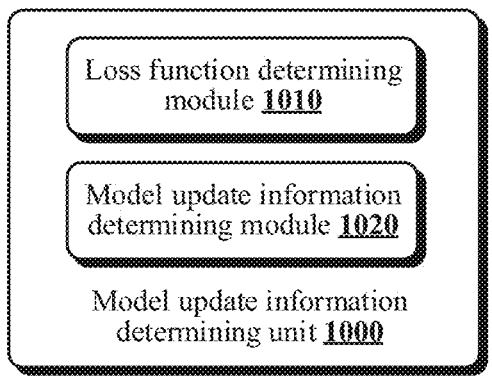
FIG. 10 is a block diagram of a model update information determining unit according to an embodiment.

FIG. 10 is a block diagram of a model update information determining unit 1000 according to an embodiment. For example, the model update information determining unit 1000 may be the model update information determining unit 920 (FIG. 9). As shown in FIG. 10, the model update information determining unit 1000 includes a loss function determining module 1010 and a model update information determining module 1020.

The loss function determining module 1010 is configured to determine a loss function according to the predicted label data and the real label data. The model update information determining module 1020 is configured to determine the model update information of the first neural network submodel through back propagation according to the loss function. In addition, in an example in which the neural network model is a graph neural network model, the model update information determining module 1020 determines model update information of the first discriminative model through back propagation according to the loss function, and updates a feature vector representation model through back propagation according to the loss function.

Figure 11:
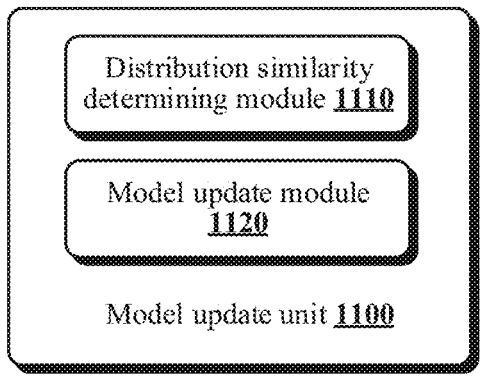
FIG. 11 is a block diagram of a model update unit according to an embodiment.

FIG. 11 is a block diagram of a model update unit 1100 according to an embodiment. For example, the model update unit 1100 may be the model update unit 950 (FIG. 9). As shown in FIG. 11, the model update unit 1100 includes a distribution similarity determining module 1110 and a model update module 1120.

The distribution similarity determining module 1110 is configured to determine a distribution similarity between the local sample probability distribution and the overall sample probability distribution.

The model update module 1120 is configured to update the first neural network submodel according to the distribution similarity and the reconstructed neural network model.

In an example, the data providing unit 930 may provide the model update information of the first neural network submodel and the local sample distribution information to the second member device through secure aggregation. An example of the secure aggregation may include, but is not limited to, secret sharing-based secure aggregation, homomorphic encryption-based secure aggregation, oblivious transfer-based secure aggregation, garbled circuit-based secure aggregation, or trusted execution environment-based secure aggregation.

In addition, the model training apparatus 900 may further include a training data obtaining unit (not shown). Each time when a cycle is performed, the training data obtaining unit is configured to obtain current training data.

Figure 12:
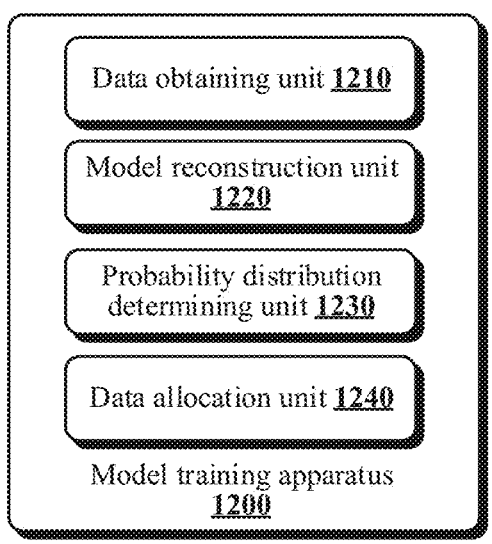
FIG. 12 is a block diagram of an apparatus for training a neural network model according to an embodiment.

FIG. 12 is a block diagram of an apparatus 1200 for training a neural network model, hereinafter referred to as the model training apparatus 1200, according to an embodiment. In this embodiment, the neural network model includes first neural network submodels on respective first member devices, and private data of each first member device is non-independent and identically distributed data. The model training apparatus 1200 is applied to a second member device.

As shown in FIG. 12, the model training apparatus 1200 includes a data obtaining unit 1210, a model reconstruction unit 1220, a probability distribution determining unit 1230, and a data allocation unit 1240.

When model training is performed, the data obtaining unit 1210, the model reconstruction unit 1220, the probability distribution determining unit 1230, and the data allocation unit 1240 operate cyclically until an end-of-cycle condition is met. The end-of-cycle condition may include, for example: a predetermined number of cycles is reached, or a change volume of a model parameter of each first neural network submodel is not greater than a predetermined threshold. Before the end of cycle, the first neural network submodel of each first member device after the update is used as a current model of a next cycle.

The data obtaining unit 1210 is configured to obtain model update information of the first neural network submodels and local sample distribution information from the first member devices respectively, the model update information of the first neural network submodel at each first member device being determined by each first member device according to predicted label data and real label data, the predicted label data being obtained by each first member device according to the first neural network submodel by using the private data for model training. For an operation of the data obtaining unit 1210, reference may be made to the operation of 505 described in FIG. 5 above.

The model reconstruction unit 1220 is configured to perform neural network model reconstruction according to the model update information of the first neural network submodel of each first member device. For an operation of the model reconstruction unit 1220, reference may be made to the operation of 506 described in FIG. 5 above.

The probability distribution determining unit 1230 is configured to determine an overall sample probability distribution according to the local sample distribution information of each first member device. For an operation of the probability distribution determining unit 1230, reference may be made to the operation of 507 described in FIG. 5 above.

The data allocation unit 1240 is configured to allocate a reconstructed neural network model and the overall sample probability distribution to each first member device. For an operation of the data allocation unit 1240, reference may be made to the operation of 508 described in FIG. 5 above.

Figure 13:
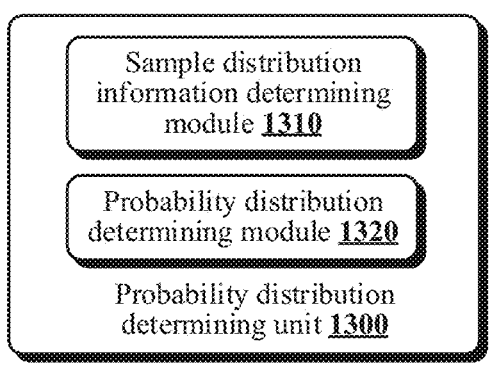
FIG. 13 is a block diagram of an implementation example of a probability distribution determining unit according to an embodiment of this specification.

FIG. 13 is a block diagram of a probability distribution determining unit 1300 according to an embodiment. For example, the probability distribution determining unit 1300 may be the probability distribution determining unit 1230 (FIG. 12). As shown in FIG. 13, the probability distribution determining unit 1300 includes a sample distribution information determining module 1310 and a probability distribution determining module 1320.

The sample distribution information determining module 1310 is configured to determine overall sample distribution information according to the local sample distribution information of each first member device.

The probability distribution determining module 1320 is configured to determine the overall sample probability distribution according to the overall sample distribution information.

In an example, each first member device may include a model reconstruction weight. Correspondingly, the model reconstruction unit 1220 may perform neural network model reconstruction according to the model update information of the first neural network submodel of each first member device and the model reconstruction weight of each first member device.

In an example, the private data for model training is batch sample data, and the model reconstruction weight of each first member device may be determined according to data quality of the private data of each first member device and/or a sample quantity of the batch sample data.

Each unit and module in the model training apparatus above may be implemented by hardware, or software, or a combination of hardware and software.

Figure 14:
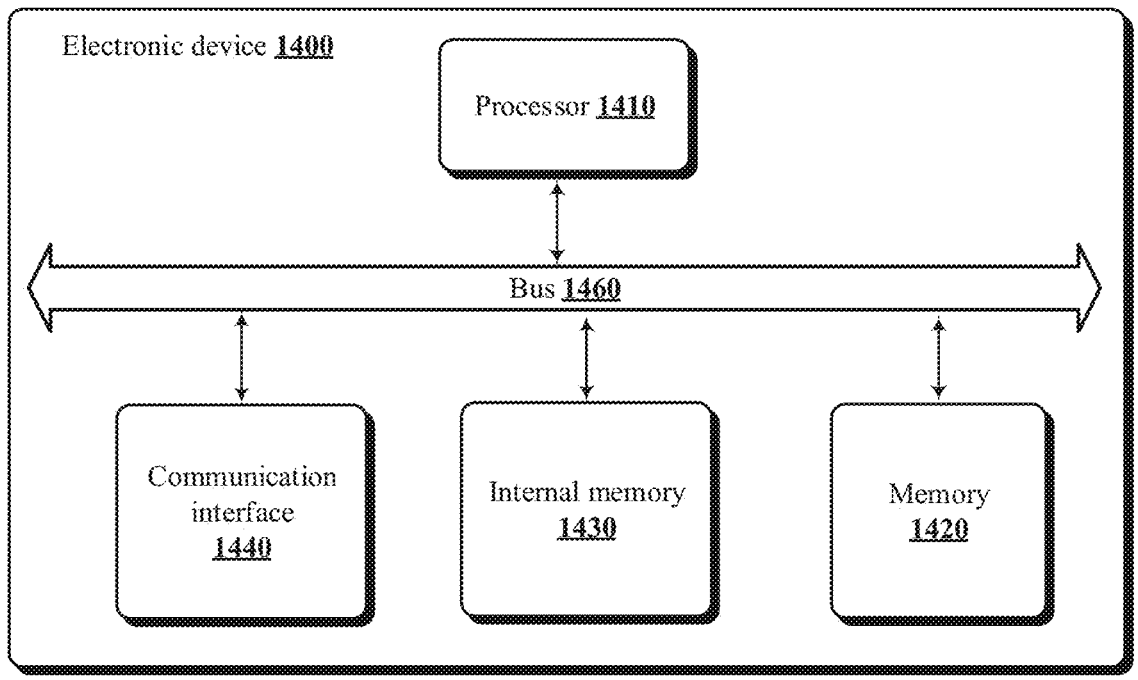
FIG. 14 is a schematic diagram of an electronic device as a first member device according to an embodiment.

FIG. 14 is a schematic diagram of an electronic device 1400 according to an embodiment. For example, the electronic device 1400 may be the first member device described above. As shown in FIG. 14, the electronic device 1400 may include at least one processor 1410, a memory 1420, and a communication interface 1440. The at least one processor 1410, the memory 1420, and the communication interface 1440 are connected through a bus 1460. The at least one processor 1410 executes at least one computer-readable instruction stored in the memory 1420 to perform the above method for training a neural network model.

In an embodiment, computer-executable instructions are stored in the memory, and the instructions, when executed, cause the at least one process 1410 to perform the following steps: obtaining predicted label data according to a first neural network submodel by using private data for model training; determining model update information of the first neural network submodel according to the predicted label data and real label data; providing the model update information of the first neural network submodel and local sample distribution information to a second member device; obtaining a reconstructed neural network model and an overall sample probability distribution from the second member device, the reconstructed neural network model being obtained by performing model reconstruction by the second member device according to the model update information of the first neural network submodel of each first member device, the overall sample probability distribution being determined by the second member device according to the local sample distribution information of each first member device; and updating the first neural network submodel according to a local sample probability distribution, the reconstructed neural network model, and the overall sample probability distribution.

Figure 15:
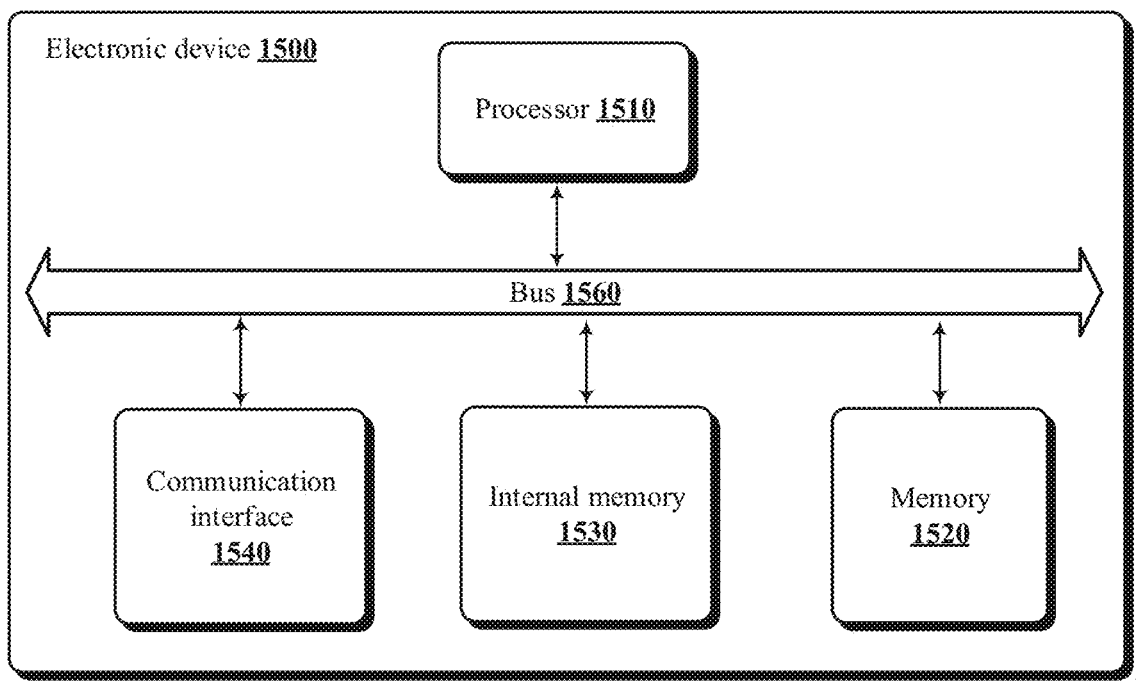
FIG. 15 is a schematic diagram of an electronic device as a second member device according to an embodiment.

FIG. 15 is a schematic diagram of an electronic device 1500 according to an embodiment. For example, the electronic device 1500 may be the second member device described above. As shown in FIG. 15, the electronic device 1500 may include at least one processor 1510, a memory 1520, and a communication interface 1540, and the at least one processor 1510, the memory 1520, and the communication interface 1540 are connected through a bus 1560. The at least one processor 1510 executes at least one computer-readable instruction stored in the memory 1520 to perform the above method for training a neural network model.

In an embodiment, computer-executable instructions are stored in the memory, and the instructions, when executed, cause the at least one processor 1510 to perform the following steps: obtaining model update information of first neural network submodels and local sample distribution information from first member devices respectively, the model update information of the first neural network submodel at each first member device being determined by each first member device according to predicted label data and real label data, the predicted label data being obtained by each first member device according to the first neural network submodel by using private data for model training; performing neural network model reconstruction according to the model update information of the first neural network submodel of each first member device; determining an overall sample probability distribution according to the local sample distribution information of each first member device; and allocating a reconstructed neural network model and the overall sample probability distribution to each first member device.

Embodiments of the present specification also provide a non-transitory computer-readable storage medium. The storage medium may include instructions that, when executed by a processor of a device, cause the device to perform the above method for training a neural network model. For example, the storage medium may be a floppy disk, a hard disk, a magneto-optical disk, an optical disc (for example, a CD-ROM, a CD-R, a CD-RW, a DVD-ROM, a DVD-RAM, a DVD-RW, or a DVD-RW), a magnetic tape, a non-volatile storage card, and a ROM. The instructions may also be downloaded from a server computer or a cloud through a communication network.

It should be noted that, not all steps or units described above are necessary, and some steps or units may be omitted according to an actual requirement. An execution sequence of the steps is not fixed and may be adjusted according to a requirement. The apparatus structure described in the embodiments may be a physical structure or a logical structure. Some units may be implemented by the same physical entity, or some units may be implemented by a plurality of physical entities, or may be implemented by some components in a plurality of independent devices together.

In the embodiments, the hardware units or modules may be implemented mechanically or electrically. For example, a hardware unit, module, or processor may include a permanent dedicated circuit or logic (for example, a dedicated processor, FPGA or ASIC) to complete a corresponding operation. The hardware unit or processor may further include programmable logic or a circuit (for example, a general-purpose processor or another programmable processor), which may be temporarily set by software to complete a corresponding operation. A specific implementation (a mechanical manner, a dedicated permanent circuit, or a temporarily set circuit) may be determined based on costs and time considerations.

The foregoing describes example embodiments of the present specification and are not intended to limit the present specification. For those skilled in the art, the present specification may have various alterations and changes. Any modification, equivalent replacement, improvement, and the like made within the spirit and principle of the present specification are included in the scope of the appended claims.

What is claimed is:

1. A method for training a neural network model, wherein the neural network model comprises first neural network submodels on respective first member devices, and private data of each first member device is non-independent and identically distributed data, the method comprising:

at each first member device, obtaining predicted label data according to the first neural network submodel by using the private data for model training, and determining model update information of the first neural network submodel according to the predicted label data and real label data;

providing, by each first member device, the model update information of the first neural network submodel and local sample distribution information to a second member device;

at the second member device, performing neural network model reconstruction according to the model update information of the first neural network submodel of each first member device, determining an overall sample probability distribution according to the local sample distribution information of each first member device, and allocating a reconstructed neural network model and the overall sample probability distribution to each first member device; and updating the first neural network submodel at each first member device according to a local sample probability distribution, the reconstructed neural network model, and the overall sample probability distribution.

2. The method according to claim 1, wherein the sample probability distribution comprises:
a label-based sample probability distribution;
a feature-based sample probability distribution; or
a connection edge quantity-based sample probability distribution.

3. The method according to claim 1, wherein the model update information of the first neural network submodel comprises a model parameter of the first neural network submodel; and
the performing neural network model reconstruction according to the model update information of the first neural network submodel of each first member device comprises:
performing the neural network model reconstruction according to the model parameter of the first neural network submodel at each first member device.

4. The method according to claim 1, wherein the neural network model comprises a second neural network submodel on the second member device, the second neural network submodel and the first neural network submodel comprise a same model structure, and the model update information of the first neural network submodel comprises a model update volume of the first neural network submodel; and
the performing neural network model reconstruction at the second member device according to the model update information of the first neural network submodel of each first member device comprises:
performing the neural network model reconstruction at the second member device according to the model update volume of the first neural network submodel of each first member device and a current second neural network submodel.

5. The method according to claim 1, wherein the updating the first neural network submodel at each first member device according to a local sample probability distribution, the reconstructed neural network model, and the overall sample probability distribution comprises:
at each first member device, determining a distribution similarity between the local sample probability distribution and the overall sample probability distribution, and updating the first neural network submodel according to the distribution similarity and the reconstructed neural network model.

6. The method according to claim 5, wherein the distribution similarity is a Jensen-Shannon divergence.

7. The method according to claim 1, wherein the providing, by each first member device, the model update information of the first neural network submodel and local sample distribution information to a second member device comprises:
providing, by each first member device, the model update information of the first neural network submodel and the local sample distribution information to the second member device through secure aggregation.

8. The method according to claim 7, wherein the secure aggregation comprises:
secret sharing-based secure aggregation;
homomorphic encryption-based secure aggregation;
oblivious transfer-based secure aggregation;
garbled circuit-based secure aggregation; or
trusted execution environment-based secure aggregation.

9. The method according to claim 1, wherein the determining an overall sample probability distribution according to the local sample distribution information of each first member device comprises:
determining overall sample distribution information according to the local sample distribution information of each first member device; and
determining the overall sample probability distribution according to the overall sample distribution information.

10. The method according to claim 1, wherein the determining model update information of the first neural network submodel according to the predicted label data and real label data comprises:
determining a loss function according to the predicted label data and the real label data; and
determining the model update information of the first neural network submodel through back propagation according to the loss function.

11. The method according to claim 1, wherein each first member device comprises a model reconstruction weight; and
the performing neural network model reconstruction at the second member device according to the model update information of the first neural network submodel of each first member device comprises:
performing the neural network model reconstruction at the second member device according to the model update information of the first neural network submodel of each first member device and the model reconstruction weight of each first member device.

12. The method according to claim 11, wherein the private data for model training is batch sample data, and the model reconstruction weight of each first member device is determined according to at least one of data quality of the private data of each first member device or a sample quantity of the batch sample data.

13. The method according to claim 1, wherein the training of the neural network model is cyclically performed until an end-of-cycle condition is met, and
when the end-of-cycle condition is not met, the first neural network submodel after the updating at each first member device is used as a current neural network submodel of a next cycle.

14. The method according to claim 13, wherein the end-of-cycle condition comprises:
a predetermined number of cycles; or
a change volume of the model parameter of each first neural network submodel is not greater than a predetermined threshold.

15. The method according to claim 1, wherein when the neural network model is a graph neural network model, the first neural network submodel comprises a feature vector representation model and a first discriminative model, and the neural network model reconstruction comprises discriminative model reconstruction for the first discriminative model.

16. An electronic device, comprising:
a processor; and
a memory storing instructions executable by the processor,
wherein the processor is configured to perform the method according to claim 1.

17. A method for training a neural network model, wherein the neural network model comprises first neural network submodels on respective first member devices, and private data of each first member device is non-independent and identically distributed data, the method being applicable to the first member device and comprising:
obtaining predicted label data according to the first neural network submodel of the first member device by using the private data for model training;
determining model update information of the first neural network submodel according to the predicted label data and real label data;
providing the model update information of the first neural network submodel and local sample distribution information to a second member device;
obtaining a reconstructed neural network model and an overall sample probability distribution from the second member device, the reconstructed neural network model being obtained by performing reconstruction by the second member device according to the model update information of the first neural network submodel of each first member device, the overall sample probability distribution being determined by the second member device according to local sample distribution information of each first member device; and
updating the first neural network submodel of the first member device according to a local sample probability distribution, the reconstructed neural network model, and the overall sample probability distribution.

18. An electronic device, comprising:
a processor; and
a memory storing instructions executable by the processor,
wherein the processor is configured to perform the method according to claim 16.

19. A method for training a neural network model, wherein the neural network model comprises first neural network submodels on respective first member devices, and private data of each first member device is non-independent and identically distributed data, the method being applicable to a second member device and comprising:
obtaining model update information of the first neural network submodels and local sample distribution information from the first member devices respectively, the model update information of the first neural network submodel at each first member device being determined by the first member device according to predicted label data and real label data, the predicted label data being obtained by the first member device according to the first neural network submodel by using the private data for model training;
performing neural network model reconstruction according to the model update information of the first neural network submodel of each first member device;
determining an overall sample probability distribution according to the local sample distribution information of each first member device; and
allocating a reconstructed neural network model and the overall sample probability distribution to each first member device.

20. An electronic device, comprising:
a processor; and
a memory storing instructions executable by the processor,
wherein the processor is configured to perform the method according to claim 19.

* * * * *